United States Patent [19]
Reinke et al.

[11] Patent Number: 6,116,565
[45] Date of Patent: Sep. 12, 2000

[54] HORIZONTAL GLIDE DAMPER

[76] Inventors: Harold E. Reinke, 1612 Westminster Dr., Naperville, Ill. 60563; Jerry D. Folkens, 6S 147 New Castle Rd., Naperville, Ill. 60540; Steven M. Veroeven, 6111 S. Knollwood Rd., Willowbrook, Ill. 60514

[21] Appl. No.: 09/137,939

[22] Filed: Aug. 21, 1998

[51] Int. Cl.$^7$ ................................................. F16M 13/00
[52] U.S. Cl. ........................... 248/562; 248/638; 267/136
[58] Field of Search ................................. 248/562, 563, 248/615, 632, 633, 634, 636, 638, 649, 650, 677, 678, 569, 570, 188.2, 188.3, 188.9, 346.11; 267/136

[56] References Cited

U.S. PATENT DOCUMENTS

| | | | |
|---|---|---|---|
| Re. 18,647 | 11/1932 | Phillips | 248/188.2 |
| 1,005,963 | 10/1911 | Groat et al. | 248/638 X |
| 1,987,726 | 1/1935 | Wilkerson et al. | 248/657 |
| 2,954,636 | 10/1960 | Gammache | 248/188.3 |
| 3,306,562 | 2/1967 | Bellefleur | 248/188.2 |
| 3,815,852 | 6/1974 | May | 248/615 X |
| 3,889,907 | 6/1975 | DeSourdis | 248/615 X |
| 4,114,845 | 9/1978 | Weisenberger | 248/188.2 X |
| 4,436,268 | 3/1984 | Schriever | 248/188.2 X |
| 4,575,034 | 3/1986 | Tobey | 248/615 X |
| 5,310,156 | 5/1994 | Matsumura et al. | 248/615 |

FOREIGN PATENT DOCUMENTS

| | | | |
|---|---|---|---|
| 1361684 | 4/1964 | France | 248/615 |
| 1389043 | 1/1965 | France | 248/615 |
| 169143 | 7/1989 | Japan | 248/632 |

*Primary Examiner*—Ramon O Ramirez
*Attorney, Agent, or Firm*—R. Jonathan Peters

[57] ABSTRACT

A machinery mount for supporting at least a portion of a load on a substructure, and for correcting out-of-level conditions and absorption of horizontal forces. The mount includes a horizontally disposed, discoidal member having a substantially planar horizontal surface and an opposed surface having a first spherical segment for complementary registration with a seat having a second spherical segment of opposite curvature to the first spherical segment to allow the discoidal member to swivel on the seat along the arc defined by the second spherical segment. A rigid member is disposed beneath the discoidal member, and a resilient member is disposed beneath the rigid member and adaptable for disposition adjacent the substructure. A second, substantially horizontally disposed member is disposed adjacent the discoidal member in the horizontal plane and free to move laterally as a result of a horizontal force, and a retaining means at least partially circumscribes the second horizontally disposed member and is spaced therefrom for limiting the lateral movement of the second horizontally disposed member.

12 Claims, 7 Drawing Sheets

HORIZONTAL GLIDE DAMPER

FIELD OF THE INVENTION

This invention relates to a vibration isolating mount or machinery mount. In its more specific aspect, this invention relates to a vibration isolating mount or machinery mount utilizing a horizontal glide damper to substantially eliminate migration or walking resulting from horizontal forces.

BACKGROUND AND PRIOR ART

Extremely heavy loads such as machinery, equipment, presses, and the like, are subjected to shock and vibration and are susceptible to misalignment due to these forces and/or due to settling including settling of the foundation. (Hereinafter, including the appended claims, the term "machine" or "machinery" is used generically and is intended to include all such equipment, apparatus, etc.) Proper alignment, including leveling, flatness, and the like, is essential in order to operate efficiently, economically and safely.

The prior art discloses various types or designs of adjustable mounts or isolating mounts to correct for out-of-level or out-of-flatness conditions. This prior art includes, for example, U.S. Pat. No. 3,332,647 to Young; U.S. Pat. No. 4,047,427 to Young; and U.S. Pat. No. 4,846,436 to Young et al., which disclose an adjustment member engagable with a support member for the machine footing and maintained in spaced relationship from a bearing member. In addition, it is desirable to protect or isolate the machinery as much as possible from the damaging effects of shock and vibration. Heavy machinery, for example punch presses standing twenty feet or higher and weighing as much as a million pounds or more, can be damaged or become misaligned, and therefore it is necessary to absorb as much of the shock and vibration as possible. In each of the above cited patents, the isolating machinery mount incorporates an elastomeric cushion or resilient pad, which is positioned below the bearing member and rests on the substructure, e.g. foundation or floor. In this manner, the machine is protected from undesirable shock and vibrations.

The vibrations resulting from a machine cause horizontal forces which distort horizontally the elastomeric cushion or resilient pad, and as a consequence the isolator tends to migrate or walk. The movements of a machine are rapid, repetitive, jerky and/or sudden, and include fast acceleration and deceleration. The machine generates horizontal inertia forces due to horizontally moving masses in the machine. The resilient cushion or pad shears with the direction of the force. Thus, a horizontal force will deflect the resilient cushion or pad, and if the force is of sufficient magnitude, the cushion or pad then will overcome the coefficient of friction and cause the isolator to move or the machine itself to move. The resilient pad can move relative to the substructure, e.g. floor, or the machine can move relative to the isolator.

The present invention has therefore as its purpose to provide a vibration isolating mount or machinery mount having incorporated therein a glide damper for mounting between the machinery and the substructure to protect the machinery from the adverse effects of horizontal forces resulting from undesirable shock and vibration including forces transmitted through the substructure or generated by the operation of the machinery.

It is another object of this invention to provide for such a machinery mounting system which substantially minimizes or substantially eliminates horizontal migration or walking due to horizontal forces, especially walking of the resilient pad or elastomeric cushion.

SUMMARY OF THE INVENTION

In accordance with the present invention, there is provided a vibration isolating mount or machinery mount (sometimes referred to in the art as an isolator) for supporting at least a portion of a load on a substructure such as a foundation or floor. Broadly, the machinery mount or vibration isolator includes a substantially horizontally disposed, discoidal member having a substantially horizontal disposed planar surface, and an opposed spherical surface. The planar and spherical surfaces of the discoidal member referred to herein and in the appended claims are intended to mean that such a surface being planar or spherical may comprise a portion only of the total surface or essentially the entire surface. The discoidal member having a spherical surface is retained by the complementary registration with a spherical seat of opposite or complementary curvature, which thereby allows the discoidal member to swivel along an arc defined by the spherical seat. Thus, for example, the discoidal member can have a convex surface for complementary registration with a concave seat, as explained hereinbelow in greater detail. It will be observed that the complementary spherical surfaces, that is surfaces with complementary curvature, allow for universal movement of the discoidal member within defined limits established by suitable limiting means, and, preferably, movement or swiveling is limited to about five degrees relative to the horizontal plane. A rigid member is disposed beneath the discoidal member, and a resilient cushion is disposed beneath the rigid member and is adaptable for disposition adjacent the substructure. A second substantially horizontally disposed member, such as a plate member or preferably an annulus, is disposed adjacent the discoidal member in the horizontal plane and is free to move laterally as a result of a horizontal force. A retaining means at least partially circumscribes the support member and is spaced therefrom for limiting the lateral movement of the second horizontal member.

In one embodiment of the invention, the second horizontally disposed member has a concave spherical surface which forms the seat for complementary registration with the convex spherical surface portion of the discoidal member. Thus, the complementary or matching spherical surfaces allow the discoidal member to seat on the concave surface of the second horizontal member thereby providing universal movement or swiveling of the discoidal member on the seat along the arc defined by the concave spherical surface and within defined limits. Preferably, the second horizontal member comprises an annulus with the interior surface of the ring being concave and spherical for matching registration or engagement with the convex spherical surface of the discoidal member. This annulus is seated on the rigid member, and the retaining means for limiting the lateral movement of the second horizontal member, which means may be formed integrally with the rigid member, at least partially circumscribes the annulus. In an alternative embodiment of the invention, the rigid member may be provided with a concave spherical surface for matching registration or engagement with the convex spherical surface of the discoidal member, and the second horizontal member may be disposed above the discoidal member. In this latter embodiment, the retaining means for limiting the lateral movement of the second horizontal member may be formed integrally with the discoidal member.

Where desired, a compressible or resilient member is disposed between the second horizontal member and the retaining means, and preferably this compressible member circumscribes and is concentric with the second horizontal member. The compressible member is preferably less stiff horizontally than the resilient cushion disposed adjacent the substructure. Also, it is desirable that the retaining means for limiting the lateral movement of the second horizontal member be formed integrally with the rigid member.

DETAILED DESCRIPTION OF THE INVENTION

Figure 1:
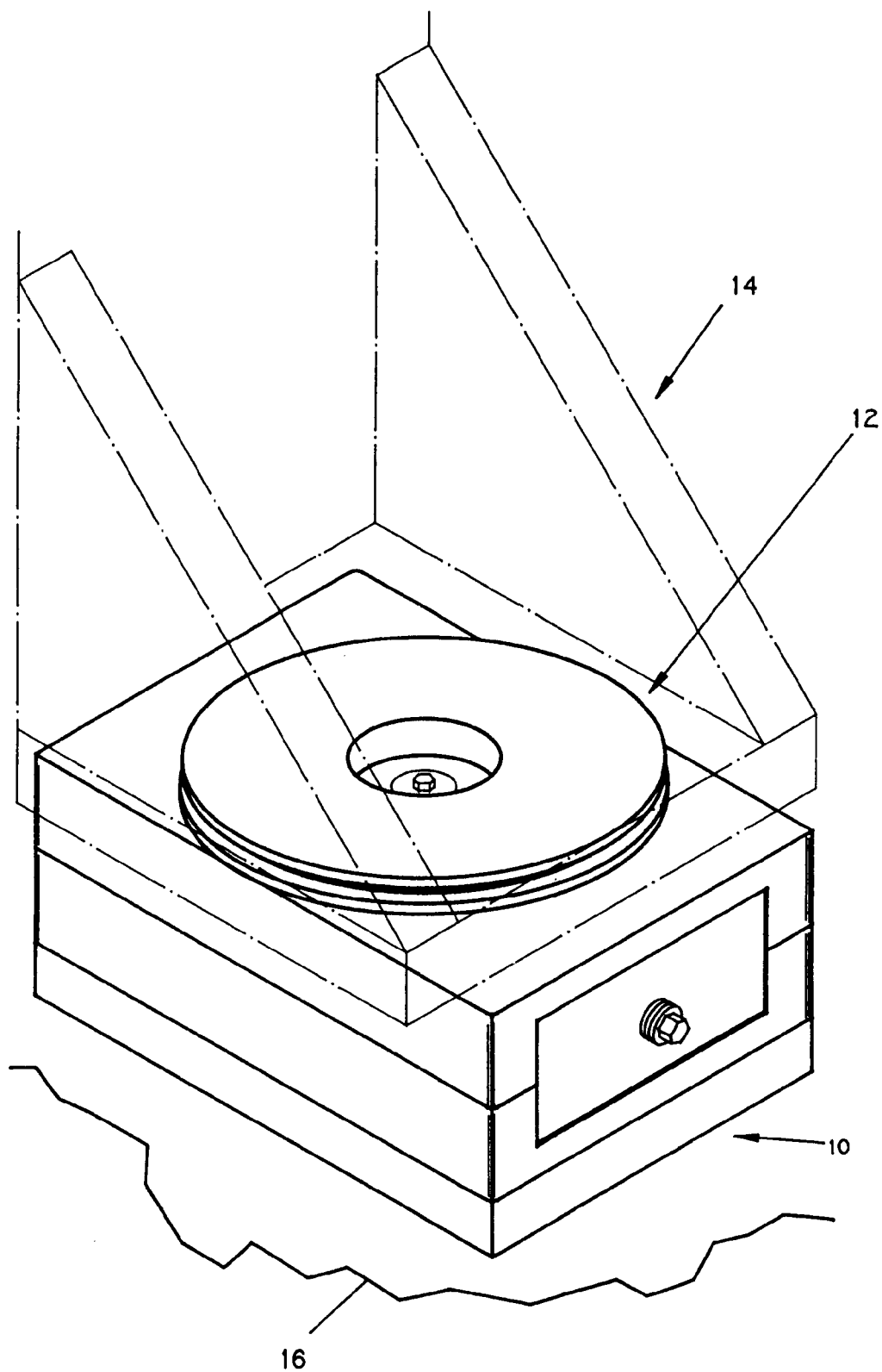
FIG. 1 is a diagrammatic, perspective view of a vibration isolating mount for machinery used in conjunction with a machine footing and embodying the features of the present invention.
Figure 2:
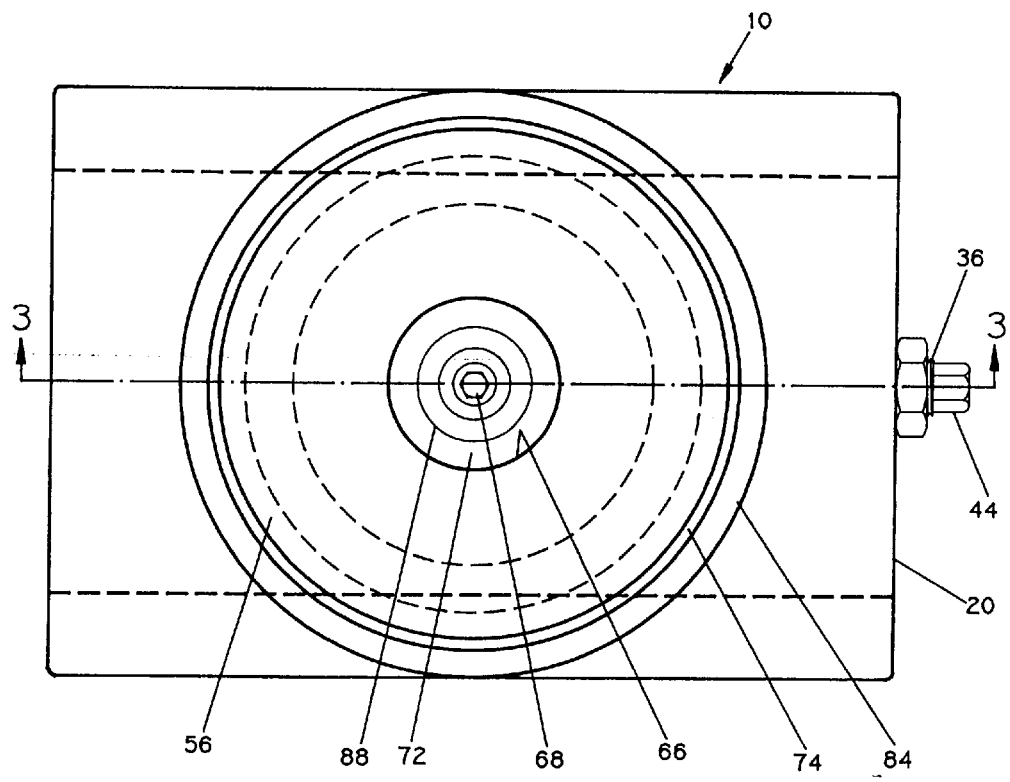
FIG. 2 is a plan view of the vibration isolating mount showing in some detail the horizontal glide damper embodying the features of the present invention.

In referring to the drawings, wherein like reference numerals designate similar parts throughout the several views, there is illustrated in FIG. 1 a machine mounting system, generally indicated by the numeral 10, such as to correct for out-of-level and/or out-of-flatness conditions, and is adaptable for bearing a load. The machine mounting system 10 includes a glide damper, indicated by the numeral 12 and described below in detail. Load member 14, shown in phantom, may be a corner foot of a heavy machine to be adjustably spaced from a base member or substructure 16, such as the floor of a building. Although there is illustrated a single mounting unit, it should be understood that the same unit can be used at each of the various mounting points of a machine, e.g. at each of the four corner feet of a machine, for leveling and fine-tuning the distribution of support for the entire machine. It is understood in this art that a machine may have three, four, or more mounting points. The machine mount illustrated in FIGS. 1–4 is a wedge isolator which is well known in the art, and is selectively adjusted by wedge-like spacers actuated by an adjustment screw and described below. Where desired, the isolator may utilize a vertically disposed adjustment screw having its longitudinal axis substantially transverse to the load, such as shown in U.S. Pat. Nos. 3,332,647 and 4,846,436 cited above.

Figure 3:
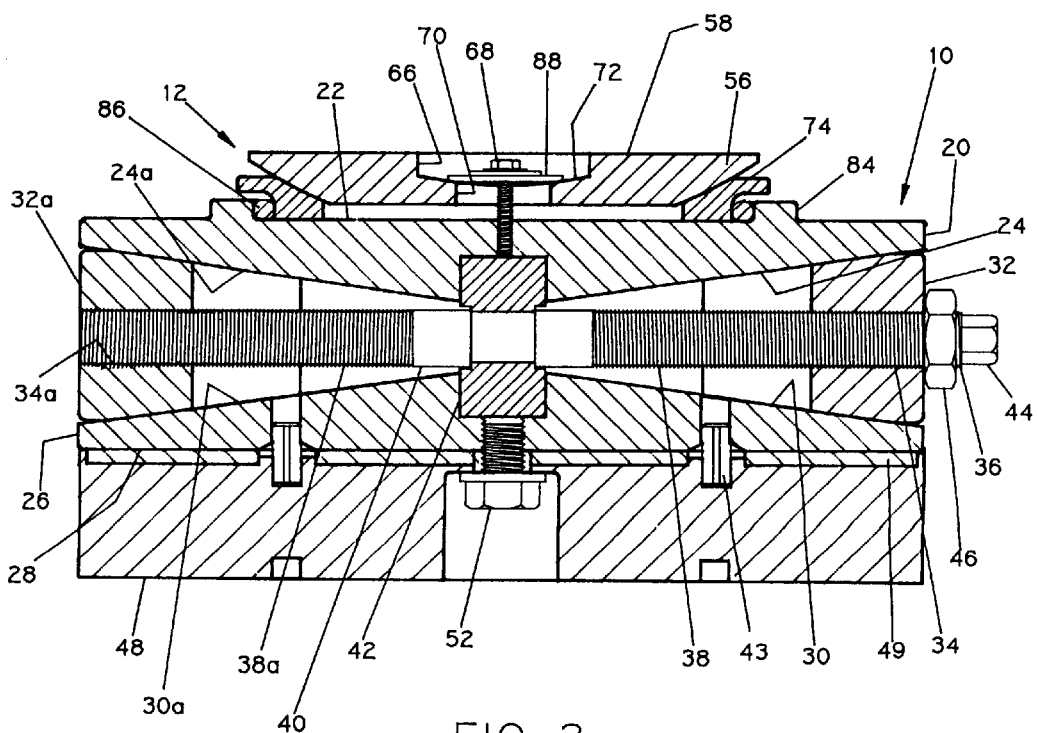
FIG. 3 is an elevational view, in cross-section, taken on line 3—3 of FIG. 2, and illustrating the machinery mount in greater detail.
Figure 4:
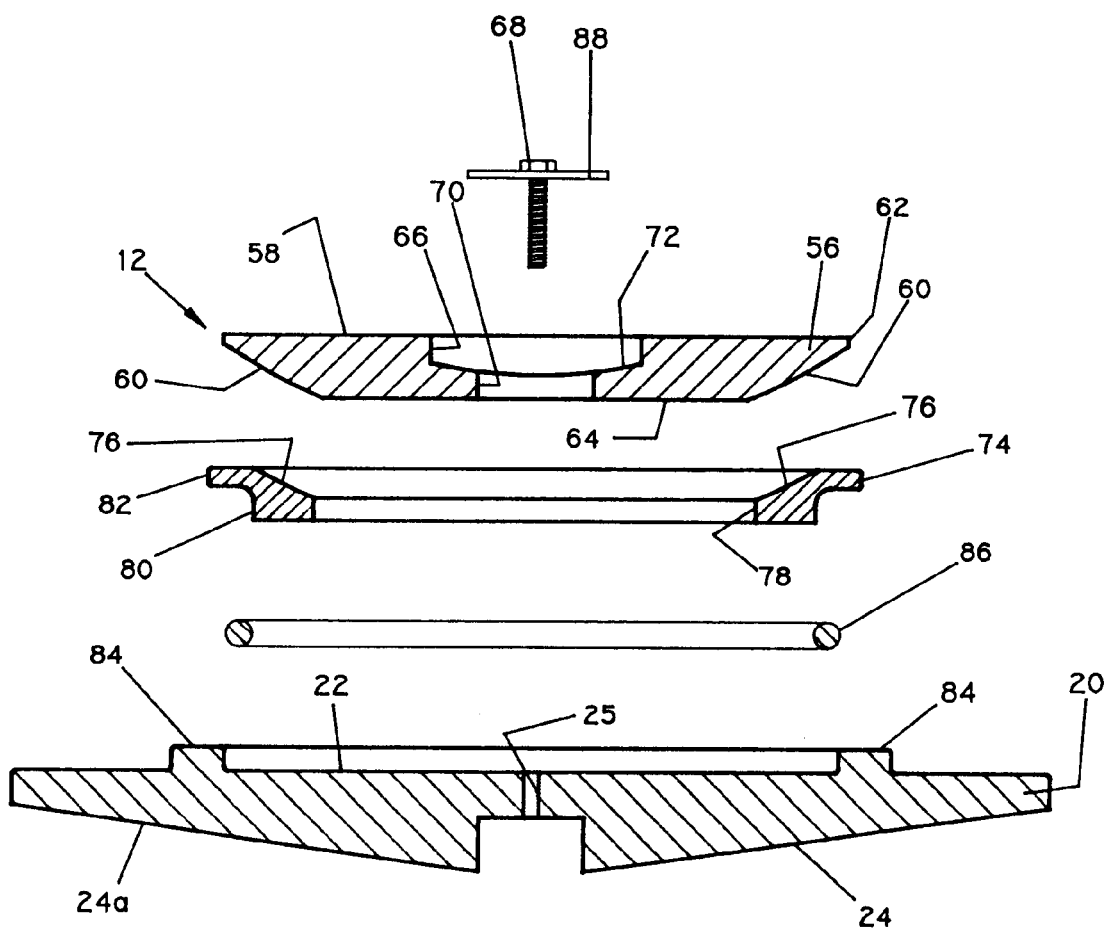
FIG. 4 is an exploded elevational view, in cross-section, of the upper members of the glide damper of FIG. 3 showing certain details of the invention.

Referring now to FIGS. 2–5 in particular, wedge isolator 10 includes an upper rigid wedge member 20, typically having a rectangular configuration, and has a substantially planar upper surface 22 and downwardly pitched or inclined lower surfaces 24 and 24a, preferably inclined from the outer edge to about the center as shown in FIG. 3, thereby exhibiting symmetry determined by a central, vertical plane. Upper wedge member 20 is provided with a transverse threaded aperture 25, for the reason explained below. Similarly, a lower wedge 26, typically having a rectangular configuration, has a planar bottom surface 28, and an upwardly pitched or inclined upper surfaces 30 and 30a, preferably inclined from the outer edge to about the center as shown in FIG. 3, thereby exhibiting symmetry determined by a central, vertical plane. That is, the inclined surfaces 30 and 30a are oppositely pitched with respect to the inclined surfaces 24 and 24a. Actuating wedge members 32 and 32a, each being truncated and having a rectangular configuration as viewed in vertical cross-section, are disposed intermediate the upper and lower wedge members 20 and 26 for slidable engagement with the inclined surfaces 24 and 24a, and 30 and 30a. Thus, actuating wedge 32 is in sliding engagement with the surfaces 24 and 30, and actuating wedge 32a is in sliding engagement with the surfaces 24a and 30a. Actuating wedge members 32 and 32a are provided with internally threaded apertures 34 and 34a, respectively. Adjustment member or adjustment screw 36, having externally and opposing threaded sections 38 and 38a and a central shank section 40, extends longitudinally through the apertures 34 and 34a for threaded engagement therewith, and is supported at the shank 40 by center post 42 set at opposite ends in complementary recesses in wedge members 20 and 26. The adjustment member 36 protrudes beyond the outer edge of the wedge 32 and terminates with a hexagonal head 44. When the adjustment member 36 is rotated as by a wrench applied to the hex head 44, the adjustment member rotates thereby sliding the actuating wedge members 32 and 32a in the direction desired to adjust the relative space between the upper and lower wedge members 20 and 26. Subsequent to adjustment of the wedge members, locking nut 46 restrains the threaded shaft of adjustment screw 36 against rotation.

Figure 5:
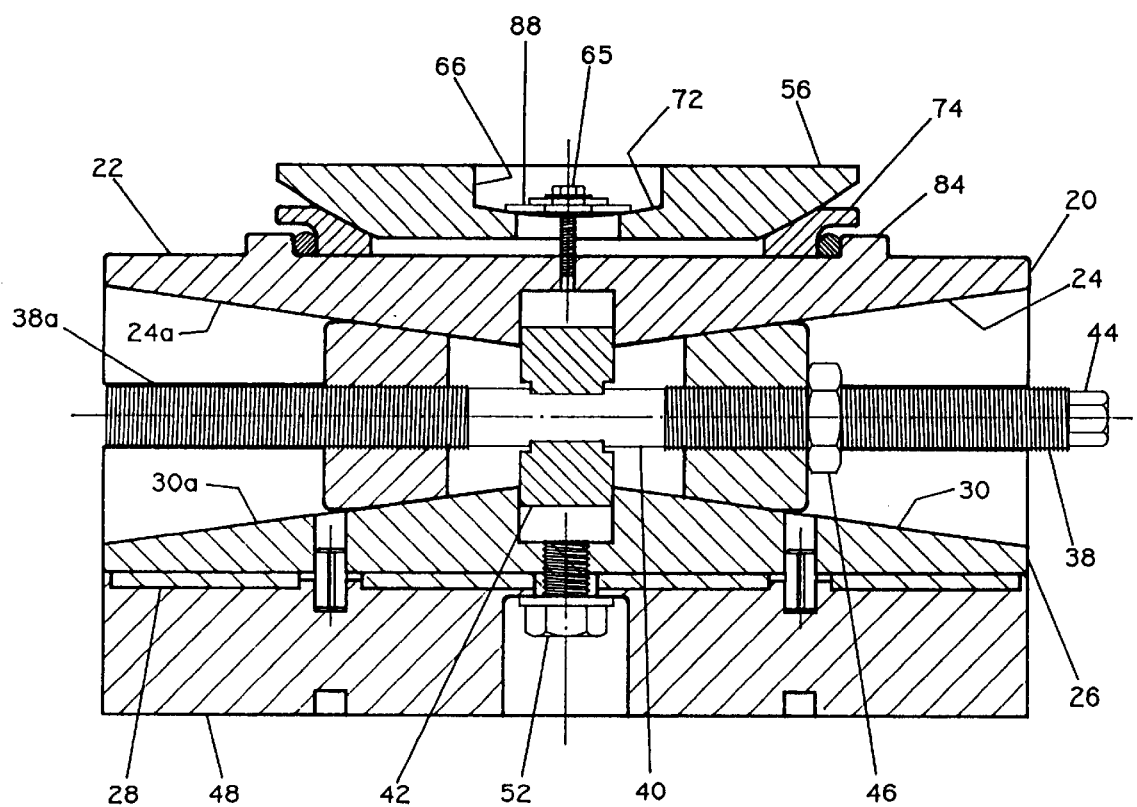
FIG. 5 is a view similar to FIG. 3 but showing the glide damper tilted about 4°.

As shown in FIGS. 3, and 5, the isolating machinery mount or isolator 10 incorporates an elastomeric cushion 48, which is ordinarily compressible and resilient. The cushion member 48 rests on the substructure 16 (e.g., floor) of a building in which the machinery is located (not shown) such that a foot 14 of the machine is positioned on the mount. (See FIG. 1.) Where desired, the top surface of the resilient cushion 48 is provided with a rigid metal plate 49 (e.g., steel plate) in order to provide a better connection between the cushion and the wedge members of the isolator by means of threaded bolt 52 in threaded engagement with lower wedge member 26 and tension pins 43. The tension pins also prevent the resilient cushion 48 from rotating due to the vibrations. The cushion member 48 is disposed in supporting relationship below lower wedge 26. It will be observed that by reason of the elastomeric cushion 48, any vibrations transmitted through the substructure below the cushion will be dampened and not fully transmitted to any machinery supported by the mount, and similarly any vibration or impact forces generated by the operation of a machine resting on the mount will be only partially transmitted to the substructure through the mount.

As shown in the preferred embodiment of FIGS. 2–5, a glide damper, indicated generally by the numeral 12, being disposed substantially transverse to the load 14 and adaptable for engagement with at least a portion of the load, includes a horizontally disposed, discoidal member 56 having a substantially planar upper surface 58 and an opposed convex, spherical bottom surface 60 joined by annular side wall 62. It will be observed that in accordance with this embodiment of the invention, the convex, spherical bottom surface 60 extends inwardly and downwardly relative to the planar top surface, but where desired, the discoidal member can be inverted and the convex, spherical surface can extend inwardly and upwardly. As stated above, the top and bottom surfaces of the discoidal member being described as planar or spherical, respectively, may comprise a substantial portion of the surface or essentially the entire surface, and in the embodiment illustrated in FIGS. 3 and 4, the bottom surface has a substantially planar section 64. Discoidal member 56 has a centrally disposed bore or opening 66 for accommodating a fastening element 68, and bore 66 is provided with a reduced section 70 thereby defining an inwardly directed, laterally projecting annular collar 72 having a concave, spherical cross-section. It should be understood, however, that the fastening element can be omitted because the weight of the machine will retain the isolator components in place, and omitting the fastening elements is more likely with a relatively small isolator.

A second, substantially horizontally disposed member or glide member 74 is positioned intermediate the discoidal member 56 and the upper wedge 20 so as to be adjacent the discoidal member 56 in the horizontal plane, and to be seated on the planar surface 22 of upper wedge 20. It is important that this second horizontal member be free to move laterally or glide as a result of a horizontal force, as explained below. This second horizontal member 74 preferably is an annulus or ring having an interior surface 76 that is concave and spherical and an interior vertical side wall 78, thereby providing for the complementary registration with the convex spherical bottom surface 60 of the discoidal member 56 to allow the discoidal member to seat on the concave spherical surface and to swivel on the seat along the arc defined by the concave spherical surface 76. Further, horizontal glide member 74 has an exterior side wall 80 terminating with an outwardly disposed annular flange or rim 82. A retaining means or stop means 84 circumscribes at least partially the second horizontal member 74 and is spaced therefrom. The retaining means 84 may be formed integrally with the upper wedge member 20 as an annulus or ring, and thereby completely circumscribe the horizontal glide member 74. It will be observed that by reason of this construction, glide member 74 is free to move laterally or to glide along the surface of the planar surface 22 of wedge 20, but the movement is limited or arrested by retaining means 84. In order to restore the horizontal glide member 74 to the original position, it is desirable to provide a compressible resilient member 86, such as a rubber or plastic O-ring, spring, or spring clip, between the exterior side wall 80 of the glide member 74 and the retaining means 84 and beneath the rim 82. Preferably, the resilient member 86 is concentric with and circumscribes glide member 74. The periphery of the resilient member 86 can engage the retaining means 84 and side wall 80, or there can be a slight clearance, and if a plastic or rubber ring is used, it preferably is softer or less stiff than the resilient cushion 48. Further, if a plastic or rubber ring is used, the ring can have a core of one composition and a cover of a different and softer composition, or the core can be a liquid such as water. It should be understood that the transverse cross-sectional shape of member 86 can be round or circular, rectangular or square, oval, etc.

In the assembly of the mounting system, and in particular the assembly of the glide damper to the wedge isolator, the horizontal glide member 74 is centered on the upper wedge 20 so as to be concentric with and circumscribed by the compressible member 86 and retaining means 84. Discoidal member 56 is seated on horizontal glide member 74 so that the convex surface 60 of member 56 is in registry with the complementary concave surface 76 of member 74. A washer 88, having a central opening (not shown), is seated on the concave collar 72, and a fastening element 68, such as an externally threaded bolt, is passed through the central opening in the washer 88 and reduced section 70, and into threaded engagement with threaded aperture 25 of upper wedge member 20. The bolt 68 is not drawn taut so that the damper is free to glide and to swivel, and the washer 88 will limit the degree of swivel when the periphery of the washer abuts the vertical wall of the bore 66.

There is illustrated in FIG. 5 the correction the glide damper will make to correct for an unparallel condition between the floor and bottom of the machine resulting in uniform loading of the machine and the isolator. In addition, the glide damper absorbs horizontal forces when horizontal glide member 74 moves horizontally or laterally. The machine mount is first set up to support a load such as the foot of a machine, and adjustments are made to correct for out-of-level and/or out-of-flatness conditions. Due to operation of the machine, however, the glide damper protects the machine from any adverse effects of horizontal forces. Because bolt 68 is not drawn tightly, the horizontal glide member 74 is free to move laterally caused by the horizontal force and O-ring member 86 will be partially compressed. It is understood by those skilled in the art that the resilient cushion 48 will be deformed. The discoidal member 56 will swivel on its seat a sufficient degree to compensate for the misalignment. FIG. 5 illustrates a swivel of 4°, but the degree of swivel, which typically will not exceed about 5°, will depend upon the requirement at that instant.

Figure 6:
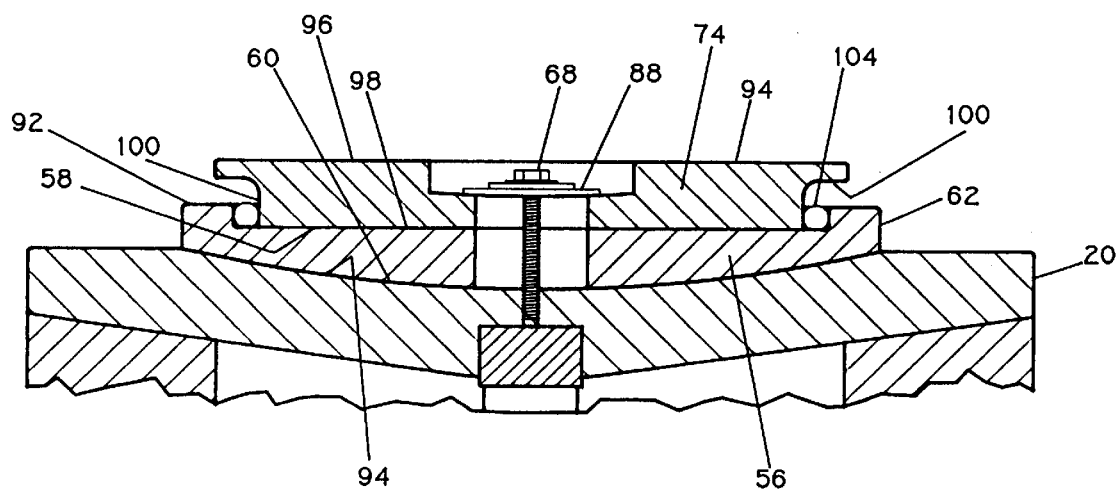
FIG. 6 is an elevational view, in cross-section, of the mount illustrating an alternative embodiment of the invention.
Figure 7:
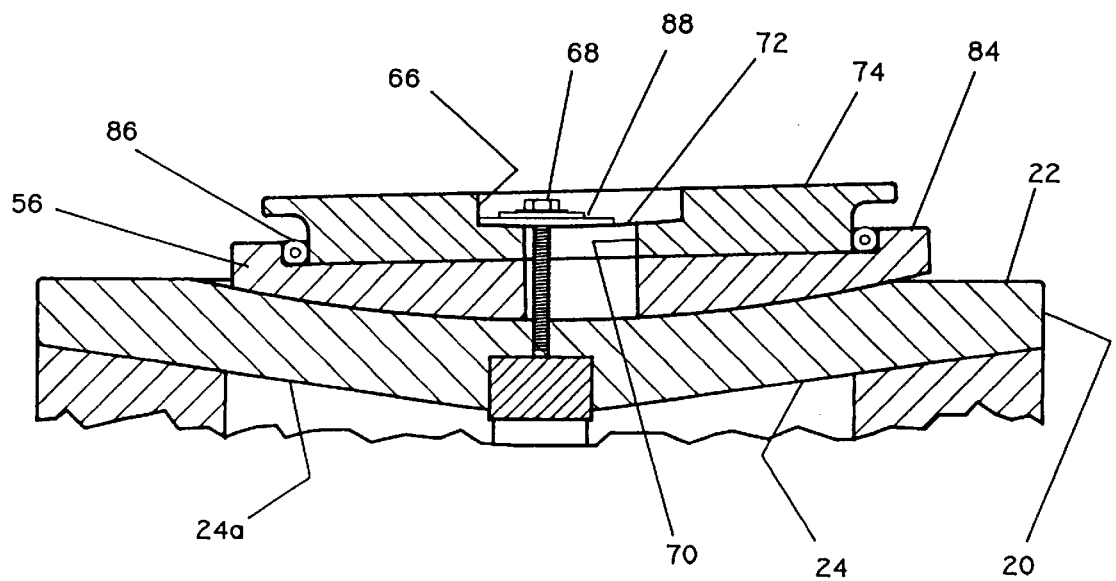
FIG. 7 is a view similar to FIG. 6 but showing the glide damper tilted about 3°.

FIGS. 6 and 7 illustrate an alternative embodiment wherein the relative position of the horizontal glide member and the discoidal member are reversed. Thus, discoidal member 56, adaptable for seating directly on the upper rigid member 20, has a substantially planar upper surface 58, side wall 62, and convex spherical bottom 60. The discoidal member 56 also is provided at the periphery with an upwardly directed annular flange 92. Rigid, upper wedge member 20 has a concave spherical surface 94 for complementary registration with the convex spherical bottom surface 60 to allow the discoidal member 56 to swivel along an arc defined by the concave surface. In this embodiment of the invention, horizontal glide member 74 is substantially a plate having opposed top and bottom planar surfaces 96 and 98, respectively, and side wall 100. The top surface 96, upon which the load is positioned (e.g., machine foot) includes an outwardly disposed annular ring 102; and bottom surface 98 is of smaller diameter than the inside diameter of member 56 defined by annular flange 92. A compressible resilient ring 104, e.g. O-ring, is spaced between the side wall 100 and the flange 92.

The mounting system is assembled essentially as described above with reference to the prior embodiment except that the discoidal member 56 is first seated on the upper rigid member 20, the horizontal glide member 74 then arranged on top of member 56. The washer 88 and fastening element 68, e.g. bolt, are then attached, but the bolt is not drawn tightly so that the slack allows the glide member to move laterally and the discoidal member to swivel on the concave seat. Aside from this difference is assembly, operation of the system is essentially the same as described above, and FIG. 7 illustrates a swivel of about 3°.

Figure 8:
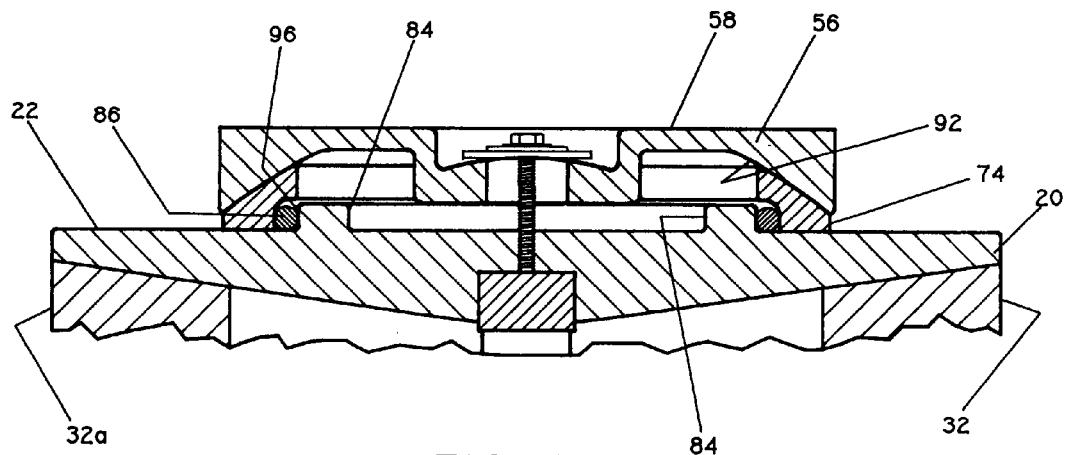
FIG. 8 is an elevational view, in cross-section, similar to FIG. 3 showing a further modification of the invention.
Figure 9:
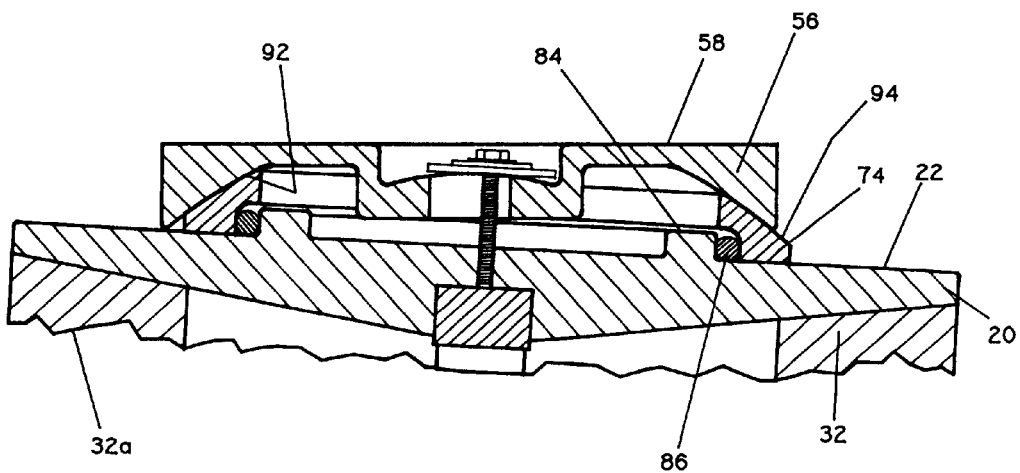
FIG. 9 is a view similar to FIG. 8 but showing the glide damper tilted about 3°.

A modified embodiment is illustrated in FIGS. 8 and 9 wherein the relative curvatures for the complementary spherical surfaces are the reverse from the embodiment shown in FIG. 3. Discoidal member 56 has a substantially planar upper surface 58 adaptable for supporting a load (e.g., foot of a machine), and a concave spherical lower surface 92. Horizontal glide member 74, preferably as an annulus as shown in FIG. 8, is disposed on the upper surface 22 of upper wedge 20, and has an outwardly disposed convex spherical surface 94. Thus, the concave spherical surface 92 is adaptable for complementary registration with the convex spherical surface 94. In this manner, the discoidal member 56 is free to swivel on the seat formed along the arc established by the convex spherical surface. Further, retaining means 84, formed as an annulus integrally with the upper wedge 20 and extending upwardly from surface 22 forming outer vertical wall 96, is spaced from and is circumscribed by glide member 74. A compressible resilient member 86, such as an elastomeric O-ring, is disposed in the space. The assembly for the mounting system is essentially the same as described above, thereby correcting for an unparallel condition due to a sloped floor and accomplishing the absorption of horizontal forces, as described above, there being shown in FIG. 9 a swivel of the discoidal member by about 4°.

Figure 10:
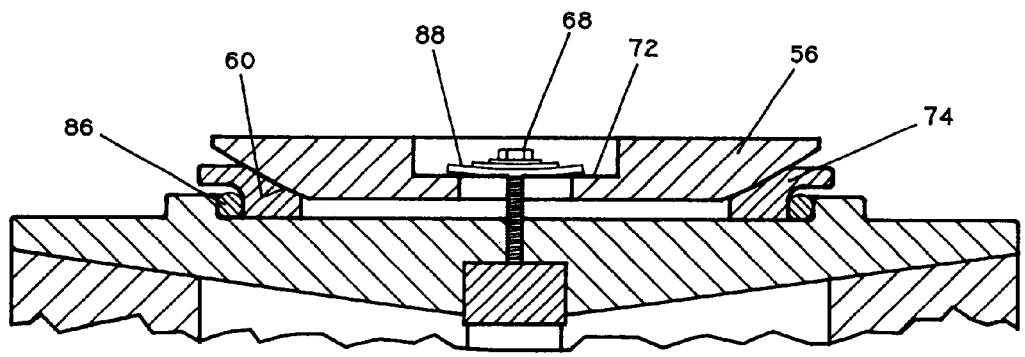
FIG. 10 is an elevational view, in cross-section, similar to FIG. 3 showing a modification of the fastening means as part of the invention.
Figure 11:
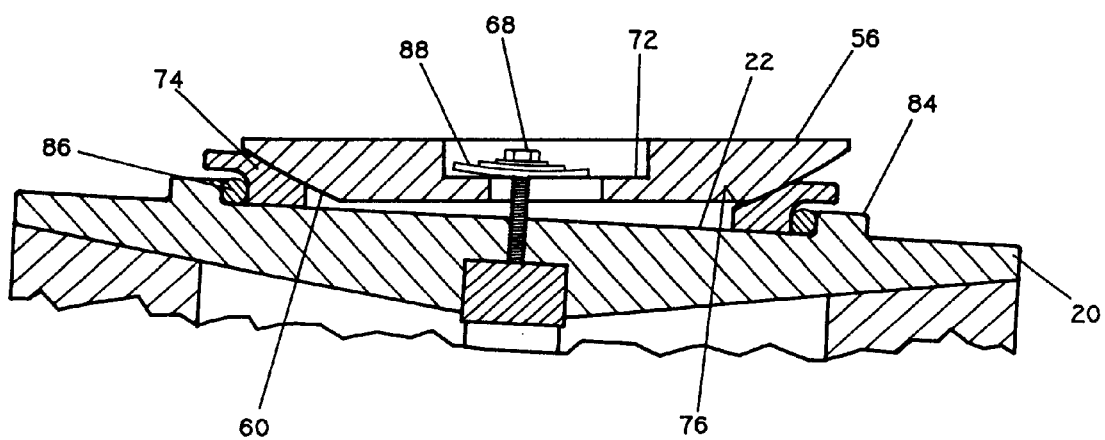
FIG. 11 is a view similar to FIG. 10 but showing the glide damper tilted about 3°.

There is illustrated in FIGS. 10 and 11 a modification of the embodiment shown in FIG. 3. As shown in the drawings, annular collar 72 is essentially planar, rather than concave as shown in the embodiment of FIG. 3, and arcuate washer 88 is seated on collar 72. The washer is retained in place by fastening element 68 (e.g., threaded bolt), which is not drawn taut, as explained above. When the mounting system makes a correction, the discoidal member 56 can swivel on its seat, as describe above, until the bottom surface of washer 88 at or near its periphery abuts collar 72, as shown in FIG. 10 and member 74 will glide laterally due to horizontal forces.

It will be observed that by reason of my invention numerous advantages are achieved in correcting for misalignment of a load resulting from horizontal forces. Further, it should be understood that the foregoing detailed description has been given for clearness of understanding only, and no unnecessary limitations should be understood therefrom, as modifications will be obvious to those skilled in the art.

What is claimed is:

1. An adjustable machinery mount for supporting at least a portion of a load on a substructure, comprising: (a) a horizontally disposed, discoidal member having a substantially planar horizontal surface and an opposed surface having a first spherical segment for complementary registration with a seat having a second spherical segment of opposite curvature to said first spherical segment to allow said discoidal member to swivel on said seat along an arc defined by said second spherical segment; (b) a rigid member disposed beneath said discoidal member; (c) a resilient member disposed beneath said rigid member and adaptable for disposition adjacent the substructure; (d) a second, substantially horizontally disposed member adjacent said discoidal member in a horizontal plane and free to move laterally as a result of a horizontal force; (e) a retaining means at least partially circumscribing said second horizontally disposed member and spaced therefrom for limiting said lateral movement of said second horizontally disposed member; and (f) an adjustable member at least a portion of which is intermediate said rigid member and said resilient member for maintaining spaced relationship between said discoidal member and said resilient member.

2. A machinery mount according to claim 1 further including means to limit said swivel along said arc.

3. An adjustable machinery mount for supporting at least a portion of a load on a substructure, comprising: (a) a horizontally disposed, discoidal member having a substantially planar top surface and opposed convex, spherical bottom surface for complementary registration with a concave spherical seat to allow said discoidal member to swivel on said seat along an arc defined by said concave spherical seat; (b) means to limit said swivel along said arc; (c) a rigid member disposed beneath said discoidal member; (d) a resilient member disposed beneath said rigid member and adaptable for disposition adjacent the substructure; (e) a second, substantially horizontally disposed member adjacent said discoidal member in a horizontal plane and free to move laterally as a result of a horizontal force; (f) a retaining means at least partially circumscribing said second horizontally disposed member and spaced therefrom for limiting said lateral movement of said second horizontally disposed member; and (g) an adjustable member at least a portion of which is intermediate said rigid member and said resilient member for maintaining spaced relationship between said discoidal member and said resilient member.

4. A machinery mount according to any one of claims 1, 2 or 3 further including a compressible resilient member disposed between said retaining means and said second horizontally disposed member.

5. An adjustable machinery mount for supporting at least a portion of a load on a substructure, comprising: (a) a horizontally disposed, discoidal member having a substantially planar top surface and a convex, spherical bottom surface extending inwardly and downwardly relative to said planar top surface; (b) a rigid member disposed beneath said discoidal member and having a concave spherical surface complementary with said spherical bottom surface of said discoidal member to allow said discoidal member to seat on said concave spherical surface and to swivel on a seat along an arc of said concave spherical surface; (c) a resilient member disposed beneath said rigid member and adaptable for disposition adjacent the substructure; (d) a second substantially horizontally disposed member seated on said planar top surface and free to move laterally as a result of a horizontal force; (e) a retaining means at least partially circumscribing said second member and spaced therefrom for limiting said lateral movement of said second member, and (f) an adjustable member at least a portion of which is intermediate said rigid member and said resilient member for maintaining spaced relationship between said discoidal member and said resilient member.

6. A machinery mount according to claim 5 wherein said compressible resilient member is less stiff horizontally than said resilient member disposed beneath said rigid member.

7. An adjustable machinery mount for supporting at least a portion of a load on a substructure, comprising: (a) a discoidal member having a substantially horizontally disposed, planar top surface adaptable for receiving said at least a portion of the load, and having a convex spherical bottom surface extending inwardly and downwardly relative to said planar top surface; (b) a rigid member disposed beneath said discoidal member and spaced therefrom; (c) a resilient member disposed beneath said rigid member and adaptable for disposition adjacent the substructure; (d) an annulus seated on said rigid member and free to move laterally as a result of a horizontal force, said annulus having a concave spherical interior surface complementary with said convex spherical surface to allow said discoidal member to seat on said concave spherical interior surface and to swivel along an arc of said concave spherical interior surface; (e) a retaining means at least partially circumscribing said annulus and spaced therefrom for limiting said lateral movement of said annulus; and (f) an adjustable member at least a portion of which is intermediate said rigid member and said resilient member for maintaining spaced relationship between said discoidal member and said resilient member.

8. An adjustable machinery mount for supporting at least a portion of a load on a substructure, comprising: (a) a discoidal member having a substantially horizontally disposed, planar top surface adaptable for receiving said at least a portion of the load, and having a concave spherical bottom surface extending inwardly and upwardly relative to said planar top surface; (b) a rigid member disposed beneath said supporting member and spaced therefrom; (c) a resilient member disposed beneath said rigid member and adaptable for disposition adjacent the substructure; (d) an annulus seated on said rigid member and free to move laterally as a result of a horizontal force, said annulus having a convex spherical exterior surface complementary with said concave spherical surface to allow said discoidal member to seat on said convex spherical interior surface and to swivel along an arc of said convex spherical interior surface; (e) a retaining means being at least partially circumscribed by said annulus and spaced therefrom for limiting said lateral movement of said annulus; and (f) an adjustable member at least a portion of which is intermediate said rigid member and said resilient member for maintaining spaced relationship between said discoidal member and said resilient member.

9. An adjustable machinery mount for supporting at least a portion of a load on a substructure, comprising: (a) a discoidal member having a substantially horizontally disposed, planar top surface adaptable for receiving said at least a portion of the load, and having a concave spherical bottom surface extending inwardly and upwardly relative to said planar top surface; (b) a rigid member disposed beneath said supporting member and spaced therefrom; (c) a resilient member disposed beneath said rigid member and adaptable for disposition adjacent the substructure; (d) an annulus seated on said rigid member and free to move laterally as a result of a horizontal force, said annulus having a convex spherical interior surface complementary with said concave spherical surface to allow said discoidal member to seat on said spherical interior surface and to swivel along an arc of said spherical interior surface; (e) an annular retaining means formed integrally with said rigid member and circumscribed by said annulus and spaced therefrom for limiting said lateral movement of said annulus; and (f) an adjustable member at least a portion of which is intermediate said rigid member and said resilient member for maintaining spaced relationship between said discoidal member and said resilient member.

10. A machinery mount according to any one of claims 1, 7 or 8 wherein said retaining means is integral with said rigid member.

11. A machinery mount according to claim 7 or claim 8 further including a compressible resilient member disposed between said annulus and said retaining means and circumscribing said annulus.

12. A machinery mount according to claim 7 or claim 8 wherein said retaining means comprises an annular boss protruding upwardly from said rigid member and is concentric with and circumscribes said annulus.

* * * * *